June 3, 1924.
A. KESSLER
GUARD ATTACHMENT FOR WHEELS
Filed April 9, 1923
1,496,648
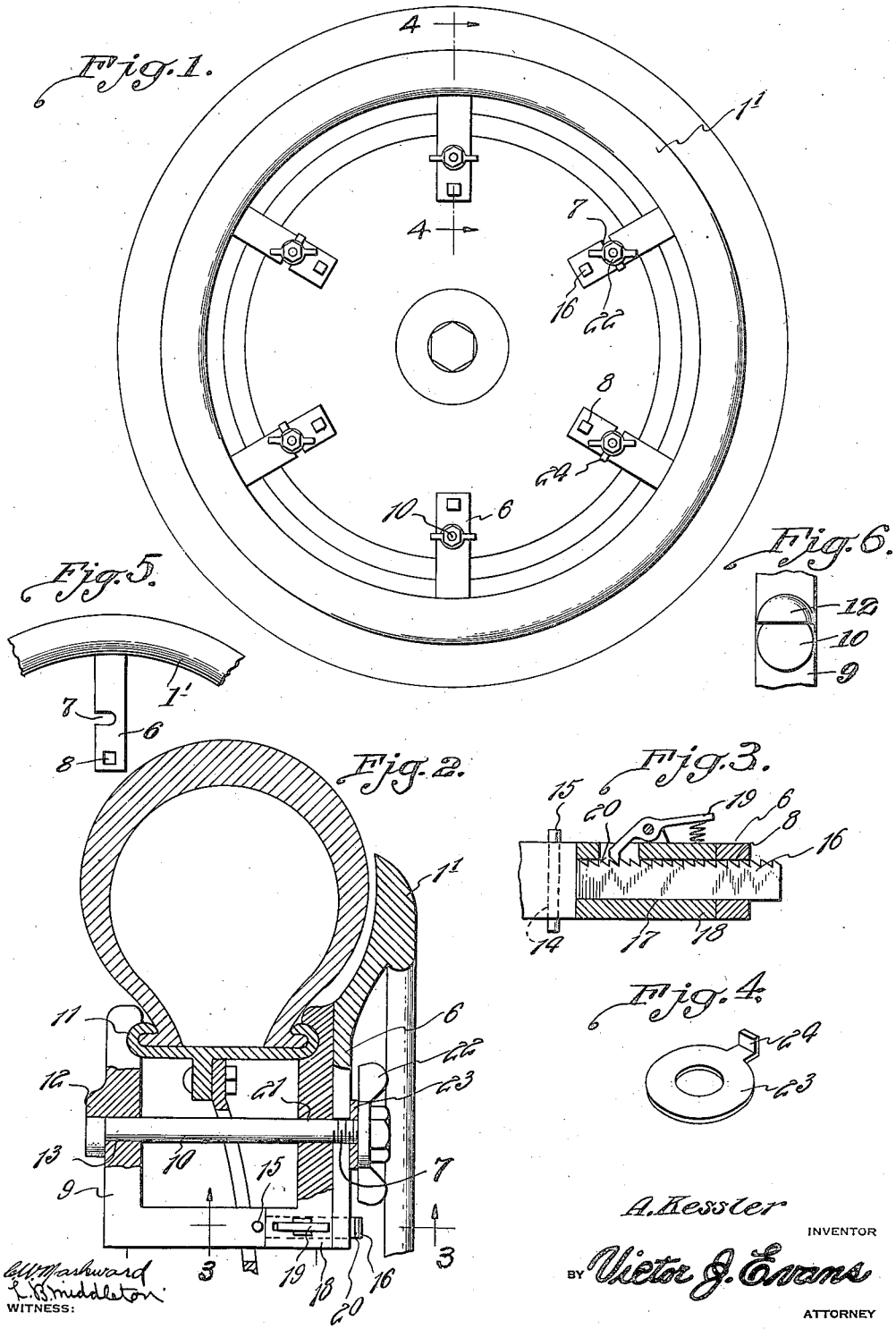

Patented June 3, 1924.

1,496,648

UNITED STATES PATENT OFFICE.

ADOLPH KESSLER, OF OREGON CITY, OREGON.

GUARD ATTACHMENT FOR WHEELS.

Application filed April 9, 1923. Serial No. 630,936.

*To all whom it may concern:*

Be it known that I, ADOLPH KESSLER, a citizen of the United States, residing at Oregon City, in the county of Clackamas and State of Oregon, have invented new and useful Improvements in Guard Attachments for Wheels, of which the following is a specification.

This invention relates to an attachment for the wheels of motor vehicles, the general object of the invention being to provide a guard for the outer side of a tire for preventing the same from coming in contact with the curb or the like.

Another object of the invention is to make the device a part of the means which hold the tire on the rim.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a section on line 4—4 of Figure 1.

Figure 3 is a section on line 5—5 of Figure 2.

The remaining figures are detail views.

Referring to Figures 1 and 2, 1 indicates a ring which is formed of any desired material and has its outer edge beveled, as at 2, for causing the ring to slip off the curb when it strikes the curb and said ring has formed integral therewith the lugs 3 which take the place of the lugs used for holding the tire rim in place. These lugs are engaged by the usual bolts, shown at 4, and the nuts 5 and said lugs are so formed that they will hold the ring spaced a slight distance from the tire with its outer edge about the center of the side of the tire.

It will thus be seen that a wheel equipped with this invention will be prevented from getting so close to a curb as to damage the tire. As the lugs are all carried by the one ring it will be seen that the rim can be easily and quickly attached to the wheel and removed therefrom.

The modified form of device is intended for use on disc wheels and wire wheels.

In this form the guard ring 1' is provided with inwardly extending ears 6 which are provided with the notches 7 and the square holes 8. The ring is held in place by the angle pieces 9 and the bolts 10 engage the ears 6. Each angle piece is provided with a recess 11 for engaging the inner edge of the tire rim and these pieces and bolts pass through holes made in the disc of the wheel or when they are used with a wire wheel they pass between the spokes thereof. Each angle piece is provided with a small projection 12 for engaging the head of the bolt to prevent turning movement of said bolt. The bolt passes through a hole 13 in the angle piece and this piece is provided with a hole 14 for receiving a pin 15 which engages the outer face of the disc to hold the parts in position when the nuts are removed. The outer end of each of the angle pieces is reduced and is of square shape in cross section, as at 16, so that it can pass through the hole 8 in the lug 6 and this reduced part also passes through a square hole 17 formed in a small angle piece 18 which has its upper part recessed to engage the outer edge of the tire rim. A spring pressed dog 19 is carried by each of the angle pieces 18 for engaging grooves 20 in the square part 16 of the large angle piece so as to removably hold the two angle pieces together with the tire rim clamped between them. Each angle piece 18 is provided with a hole 21 to receive the screw threaded end of each bolt 10 and each bolt passes through the notch 7 and receives a winged nut 22 for holding the parts together with the guard ring spaced from the tire. A washer 23 is placed on each bolt and each washer is provided with an ear 24 which is bent up to engage the edge of the member 6.

It will thus be seen that the guard ring 1' is held in spaced relation to the tire so as to guard the same against contact with the curb and by making the large angle pieces with a plurality of grooves 20 the device can be placed on different sizes of wheels. These angle pieces and the bolts constitute clamping means for detachably holding the guard ring to the tire rim.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire guard comprising a ring-shaped member, lugs carried thereby, a plurality of pairs of angle-shaped clamping members for engaging the tire rim, means for adjustably connecting the members of each pair together, a bolt passing through each pair and through a lug on the ring member, and nuts for the bolts.

2. A tire guard comprising an annular member, lugs carried thereby, a plurality of pairs of clamping members for engaging a tire rim, means for adjustably connecting the members of each pair together, a bolt passing through each pair and through a lug on the annular member, threaded elements on the bolts, nuts on said threaded elements, said means including a projection on one member of each pair of the clamping members engaging each lug on the annular member.

In testimony whereof I affix my signature.

ADOLPH KESSLER.